(12) United States Patent
Singhal et al.

(10) Patent No.: US 11,760,637 B2
(45) Date of Patent: Sep. 19, 2023

(54) METHOD OF SYNTHESIZING GRAPHENE FELTS WITHOUT USING BINDERS

(71) Applicant: LOG 9 MATERIALS SCIENTIFIC PRIVATE LIMITED, Bengaluru (IN)

(72) Inventors: Akshay Vivek Singhal, Deoband (IN); Anshul Kumar Sharma, Kangra (IN); Kunal Paul, Kolkata (IN); Arvind Bhardwaj, Jaipur (IN); Syed Shajar Ali Imam, Dibrugarh (IN); Hemant Charaya, Hisar (IN)

(73) Assignee: LOG 9 MATERIALS SCIENTIFIC PRIVATE LIMITED, Chennai (IN)

( * ) Notice: Subject to any disclaimer, the term of this patent is extended or adjusted under 35 U.S.C. 154(b) by 302 days.

(21) Appl. No.: 17/322,145

(22) PCT Filed: Nov. 15, 2019

(86) PCT No.: PCT/IN2019/050848
§ 371 (c)(1),
(2) Date: May 17, 2021

(87) PCT Pub. No.: WO2020/100168
PCT Pub. Date: May 22, 2020

(65) Prior Publication Data
US 2022/0073354 A1 Mar. 10, 2022

(30) Foreign Application Priority Data
Nov. 15, 2018 (IN) .............................. 201811043051

(51) Int. Cl.
*C01B 32/184* (2017.01)
*C01B 32/194* (2017.01)

(52) U.S. Cl.
CPC .......... *C01B 32/184* (2017.08); *C01B 32/194* (2017.08); *C01P 2006/10* (2013.01); *C01P 2006/12* (2013.01); *C01P 2006/40* (2013.01)

(58) Field of Classification Search
CPC . C01B 32/184; C01B 32/194; C01B 2204/06; C01B 2204/22; C01B 2204/24;
(Continued)

(56) References Cited

PUBLICATIONS

Chen, et al., Three diemensional Graphene aerogels as binder-less, freestanding, elastic and high-performance electrodes for lithium-ion batteries, Scientific Reports 2016; 6: 27365, doi: 10.1038/srep27365, pp. 1-9 (Year: 2016).*
(Continued)

*Primary Examiner* — Daniel C. McCracken

(57) ABSTRACT

The embodiments herein provide a facile four-step process for the preparation of binder-free graphene felts that are free standing and mechanically robust. The step of deagglomeration of graphene material leads to a uniform size distribution which when combined/integrated with an appropriate moulding technique allows an easy fine tuning of various attributes of graphene felts including electrical conductivity, porosity, surface area, surface morphology and surface functionalization depending on the desired application. Since graphene felts obtained from this process do not incorporate any binder, to achieve better electrical conductivity, electrochemical activity and catalytic and sensing properties compared to conventional graphene felts while not compromising with their mechanical properties.

15 Claims, 2 Drawing Sheets

(58) Field of Classification Search
CPC . C01B 2204/32; C01B 32/186; C01B 32/182; C01B 32/188; C01B 32/19; C01B 32/192; C01B 32/196; C01B 32/198; C01B 2204/00; C01B 2204/02; C01B 2204/04; C01B 2204/065; C01B 2204/20; C01B 2204/26; C01B 2204/28; C01B 2204/30; C01B 32/20; C01B 32/205; C01B 32/21; C01B 32/215; C01B 32/22; C01B 32/225; C01B 32/23; C01P 2006/10; C01P 2006/12; C01P 2006/40; C01P 2006/16; D01F 9/08; H01M 4/96; H01M 8/1004
See application file for complete search history.

(56) References Cited

PUBLICATIONS

Lee, et al., Simultaneous strengthening and toughening of reduced graphene oxide/alumina composites fabricated by molecular-level mixing process, Carbon 2014; 78: 212-219 (Year: 2014).*

Park, et al., Graphene Oxide Papers Modified by Divalent Ions-Enhancing Mechanical Properties via Chemical Cross-Linking, ACS Nano 2008; 2(3): 572-578 (Year: 2008).*

Zheng, et al., The synthesis and characteristics of sodium alginate/graphene oxide composite films crosslinked with multivalent cations, J. Appl. Polym. Sci. 2016; DOI 10.1002/APP.43616, pp. 1-7 (Year: 2016).*

* cited by examiner

METHOD OF SYNTHESIZING GRAPHENE FELTS WITHOUT USING BINDERS

CROSS-REFERENCE TO RELATED APPLICATIONS

The present application is a National Phase Application of the PCT application with the serial number PCT/IN2019/050848 filed on Nov. 15, 2019 with the title, "A METHOD OF SYNTHESIZING GRAPHENE FELTS WITHOUT USING BINDERS". The embodiments herein claim the priority of the Indian Provisional Patent Application with serial number IN 201811043051 filed on Nov. 15, 2018 with the title, "METHODS FOR THE PREPARATION OF GRAPHENE FELTS", and the contents of abovementioned Provisional Patent application and PCT applications are included entirely as reference herein.

BACKGROUND

Technical Field

The embodiments herein are generally related to a field of graphene nanotechnology and the processing of graphene materials. The embodiments herein are particularly related to a method of synthesising graphene felts. The embodiments herein are more particularly related a method of synthesizing/preparation of graphene felts without using any kind of binders. The embodiments herein are especially related to a method of synthesising binder-free, free-standing and mechanically robust graphene felts.

Description of the Related Art

Graphene is an atomically thin two-dimensional monolayer of sp2-hybridized carbon atoms where atoms are arranged in a hexagonal pattern and form a honeycomb lattice structure. In recent times, graphene materials have been studied extensively for range of applications such as energy storage and harvesting, purification and filtration, organic and flexible electronics, gas and chemical sensing, and metal-free catalysis due to its unique properties that includes large theoretical surface area, controllable pore structure and surface morphology, exceptional electron carrier mobility and ease of surface functionalization for further enhancement of catalytic activity and electron carrier mobility and modification of sensing selectivity and sensitivity.

Although, graphene enjoys a range of special characteristics but processing graphene materials to develop felts that preserve these special features is a challenging task. Generally, polymer binders are incorporated in the fabrication of graphene felts, to impart mechanical stability to the graphene felts thereby allows the graphene felts to essentially become a free-standing sheet. However, a usage of these binders leaves a negative impact on the characteristic properties and performance of the graphene felts. For example, polymer binders reduce the surface area and number of pores of graphene felts resulting in a drastic scaling down of the available active sites and thereby affecting electrochemical, catalytic and sensing properties of the graphene felts. Also, an addition of less/non-conductive polymers affect an overall conductivity of the graphene felts thereby yielding a direct impact on a performance and efficiency of the graphene felts in electrochemical and electronic applications.

Hence there is a need to develop a facile process to be implemented for the synthesis of graphene materials to prepare graphene felts without a need for any addition of any binders, while not compromising with mechanical properties of the graphene felts. Further there is a need for a method for deagglomeration of graphene materials in the process for the synthesis of graphene felts The above short comings, disadvantages and problems are addressed herein, which will be understood by studying the following specifications.

Objectives of the Embodiments

The primary object of the embodiments herein is to provide methods to prepare/synthesise felts of graphene without any binder material.

Another object of the embodiments herein is to provide methods to prepare binder-free graphene felts where graphene material is selected from a group consisting of graphene sheets, graphene ribbons, graphene platelets, graphene foam, graphene sponge, graphene aerogel, graphene 3D architecture, highly expanded graphite, cross-linked graphene sheets, graphene onions and graphene ballsand their derivatives.

Yet another object of the embodiments herein is to provide methods for deagglomeration of graphene materials during the fabrication/synthesis of graphene felts.

Yet another object of the embodiments herein is to provide methods for moulding of primary graphene material for the preparation/fabrication or synthesis of graphene felts wherein the moulding process is selected from a group consisting of vacuum compaction, compression, pressing, roll compaction, and injection forming processes/techniques.

Yet another object of the embodiments herein is to provide graphene felts with a thickness of 0.5 mm-15 mm.

Yet another object of the embodiments herein is to provide graphene felts with a controllable surface area of 10-100 $m^2/g$.

Yet another object of the embodiments herein is to provide graphene felts with a porosity of 5-200 µm.

Yet another object of the embodiments herein is to provide graphene felts with density of 0.02 $g/cm^3$-0.2 $g/cm^3$.

Yet another object of the embodiments herein is to provide graphene felts with a desired surface functionalization properties.

Yet another object of the embodiments herein is to provide methods for optimizing a surface morphology of the graphene felts.

Yet another object of the embodiments herein is to provide/develop self-standing and mechanically robust graphene felts with controllable and tunable electrical conductivity, porosity, density, surface area, surface morphology and surface functionalization properties.

Yet another object of the embodiments herein is to provide graphene felts in which the above-mentioned properties are easily tunable/customised based on an application in advanced energy storage and harvesting devices, efficient filtration and purification media, cheap conventional, organic and flexible electronic products, potent noble-metal-free catalysis platform, and highly sensitive gas and chemical sensors, etc.

Yet another object of the embodiments herein is to provide a process of producing graphene felts from graphene material having nano and micro fibrous structure only.

Yet another object of the embodiments herein is to provide a process of synthesizing graphene materials without nano and micro fibrous structures through electrospinning and chemical or physical crosslinking processes to prepare fibers for producing graphene felts.

These and other objects and advantages of the embodiments herein will become readily apparent from the following detailed description taken in conjunction with the accompanying drawings.

SUMMARY

The various embodiments herein provide a plurality of methods to prepare/synthesise graphene felts without any organic/inorganic, fluorinated/non-fluorinated binder.

According to one embodiment herein, a method of synthesizing graphene felts comprises the following steps. A predetermined amount of graphene raw material is segregated. The graphene raw material is segregated by a process/techniques selected from a group consisting of carding, mechanical delumping, sonication, shearing and sieve shaking processes. The weight of the segregated graphene raw material is optimized. The graphene raw material is functionalized. The functioanlized graphene raw material is processed to provide nano or microfibrous structure to graphene raw material. The processed nano or micro structure of graphene raw material entangle to form graphene felt during compaction step. The graphene raw material is deagglomerated for achieving uniform size distribution and uniform material density of graphene raw material using a process. The deagglomerated graphene material is poured in a pre-designed mold for mechanical compaction. The mold is selected from a group consisting of positive mold and negative mold. The graphene felts are treated with chemical agents for enhancing surface characteristics for 2-3 hours. The chemical agents introduce functional groups on the surface of graphene felts. The functional groups are based on nitrogen and oxygen. The graphene felts are washed after 2-3 hours with distilled water to remove the excess of chemical agents. The functional groups on the surface of graphene felts make the graphene felts hydrophilic. The graphene felts are analyzed for porosity, thickness, surface area and density.

According to one embodiment herein, the predetermined amount of graphene raw material is in a range of 97% w/w-100% w/w, and wherein optionally a cross-linking agent is added to the graphene raw material. The cross-linking agents have nano and micro fibrous nature to the graphene material.

According to one embodiment herein, the graphene felts synthesized without any binder material exhibit high thermal conductivity and electrical conductivity properties.

According to one embodiment herein, the graphene raw material is selected from a group consisting of graphene sheets, graphene ribbons, graphene platelets, graphene foam, graphene sponge, graphene aerogel, graphene 3D architecture, expanded graphite, cross-linked graphene sheets, graphene onions and graphene balls.

According to one embodiment herein, the deagglomeration process is selected from a group consisting of mechanical delumping, sonication, shearing and sieve shaking processes. During the deagglomeration process, lumps of graphene material are broken into small chunks with a pre-defined (pre-set) size.

According to one embodiment herein, the method of mechanical compaction is selected from a group consisting of vacuum compaction, compression, pressing, roll compaction and injection forming processes. After mechanical compaction graphene felts are obtained.

According to one embodiment herein, the chemical agents are selected from a group consisting of acids and bases.

According to one embodiment, the acid used for treating graphene felts is $H_2SO_4$, and the base used for treating graphene felts is KOH.

According to one embodiment herein, the graphene felts exhibit a porosity of 5-200 μm.

According to one embodiment herein, the thickness of graphene felts is within a range of 0.5 mm-15 mm.

According to one embodiment herein, the surface area of the graphene felts is within a range of 10-100 $m^2/g$.

According to one embodiment herein, the density of graphene felts is within a range of 0.02 $g/cm^3$-0.2 $g/cm^3$.

According to one embodiment herein, a methods is provided to prepare/fabricate/synthesize binder-free graphene felts and wherein graphene material is selected from a group consisting of graphene sheets, graphene ribbons, graphene platelets, graphene foam, graphene sponge, graphene aerogel, graphene 3D architecture, highly expanded graphite, cross-linked graphene sheets, graphene onions, and graphene balls and their derivatives.

According to one embodiment herein, a method is provided for deagglomeration of graphene materials during the preparation/fabrication/synthesis of graphene felts to achieve a uniform size distribution of graphene material, and wherein the deagglomeration process is selected from a group consisting of mechanical delumping, sonication, shearing, sieve shaking processes and combination there of.

According to one embodiment herein, a method for moulding primary graphene material for the preparation/synthesis of graphene felts, and wherein the moulding process is one out of vacuum compaction, compression, pressing, roll compaction and injection forming that leads to controllable porosity, thickness, density, flexibility and surface morphology.

According to one embodiment herein, the method provides graphene felts with a thickness in the range of 0.5 mm-15 mm with variable flexibility.

According to one embodiment herein, the method provides graphene felts with a controllable surface area in the range 10-100 $m^2/g$ to support a plurality of applications such as energy storage, energy harvesting, gas and chemical sensing, and catalysis.

According to one embodiment herein, the method yields/provides graphene felts with a porosity in the range of 5-200 μm, and wherein this controllable porosity is applicable to filtration and purification systems, energy storage and harvesting devices, and gas sensing devices.

According to one embodiment herein, the method provides/yields graphene felts with a density in the range of 0.02 $g/cm^3$-0.2 $g/cm^3$.

According to one embodiment herein, the method provides/yields graphene felts with a desired surface functionalization characteristics.

According to one embodiment herein, a method for optimizing the surface morphology of the graphene felts is provided, and wherein the surface morphology is optimized with respect to a desired application. The controlled morphology is achieved through the pattern on the mould during the moulding process.

According to one embodiment herein, a process of producing graphene felts is only applicable for graphene material having nano and micro fibrous structure. The graphene materials which do not possess nano and micro structure are processed using electrospinning, and chemical or physical crosslinking processes to achieve the fibres with required structures. The graphene material can be subjected to electrospinning, chemical or physical crosslinking for achieving the nano or micro fibrous structure.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The other objects, features and advantages will occur to those skilled in the art from the following description of the preferred embodiment and the accompanying drawings in which.

Figure 1:
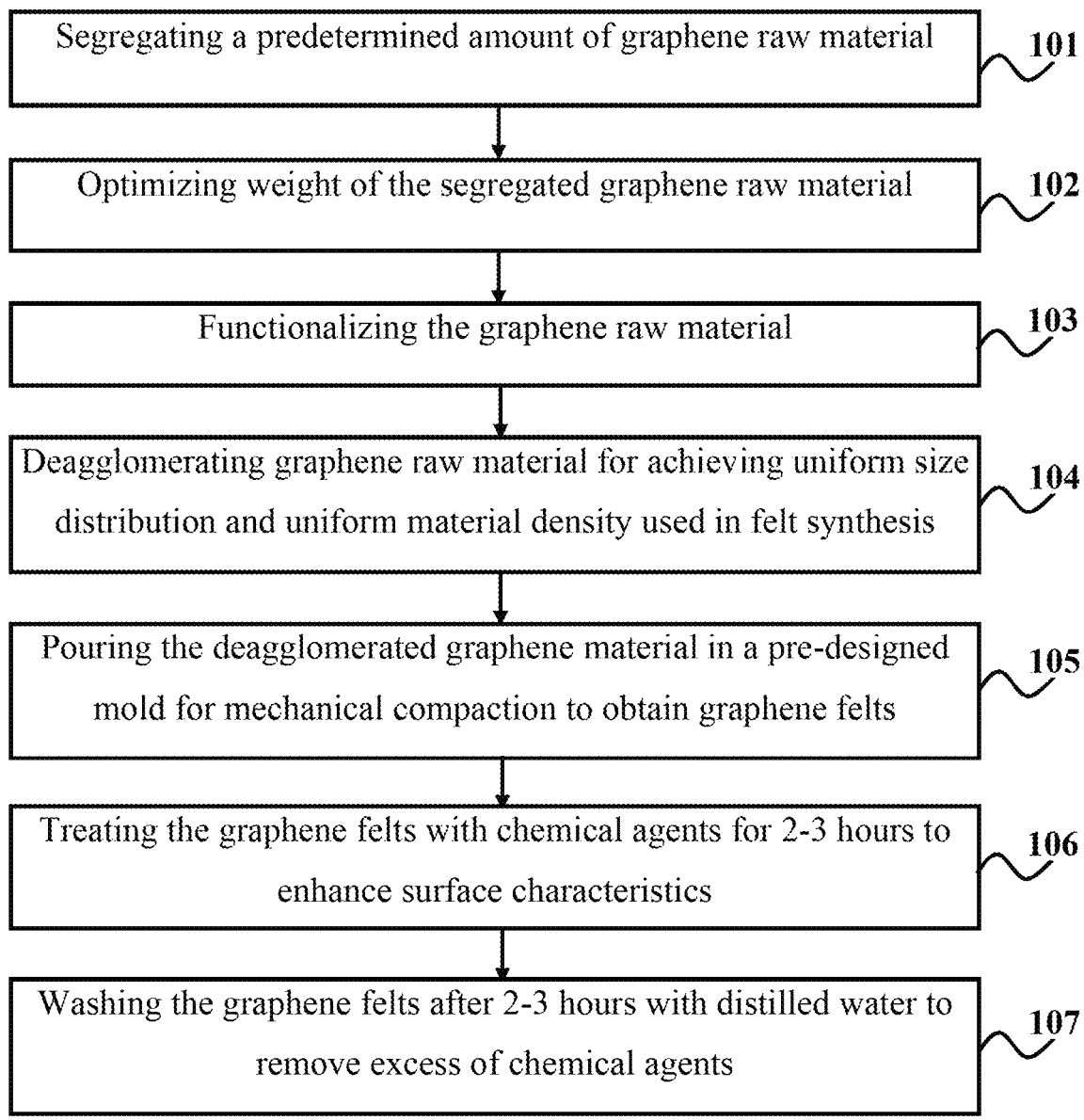
FIG. 1 illustrates a flow chart explain a process for the synthesis of binder-free graphene felts, according to one embodiment herein.

Although the specific features of the embodiments herein are shown in one or more drawings, the features may not be restricted to the illustrated drawings. This is done for convenience only as each feature may be combined with any or all of the other features in accordance with the embodiments herein. The features of the embodiments herein are described in drawings and of which a few are not shown in all. These features can be combined with any or all other features that exist in the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments of the embodiments herein provide a method of synthesizing graphene felts without using binders.

According to one embodiment herein, a method is provided to prepare/synthesize binder-free graphene felts and wherein a graphene material is selected from a group consisting of graphene sheets, graphene ribbons, graphene platelets, graphene foam, graphene sponge, graphene aerogel, graphene 3D architecture, highly expanded graphite, cross-linked graphene sheets, graphene onions and graphene balls and their derivatives.

According to one embodiment herein, a method of synthesizing graphene felts comprises the following steps. A predetermined amount of graphene raw material is segregated. The graphene raw material is segregated by a process/techniques selected from a group consisting of carding, mechanical delumping, sonication, shearing and sieve shaking processes. The weight of the segregated graphene raw material is optimized. The graphene raw material is functionalized. The functionalized graphene raw material is processed to provide nano or microfibrous structure to graphene raw material. The processed nano or micro structure of graphene raw material entangle to form graphene felt during compaction step. The graphene raw material is deagglomerated for achieving uniform size distribution of graphene raw materials and thereby uniform material density in the graphene felt. The deagglomerated graphene material is poured in a pre-designed mold for mechanical compaction. The mold is selected from a group consisting of positive mold and negative mold. The graphene felts are treated with chemical agents for enhancing a surface characteristics for 2-3 hours. The chemical agents are used to introduce functional groups on the surface of graphene felts. The functional groups are based on nitrogen and oxygen. The graphene felts are washed after 2-3 hours with distilled water to remove the excess of chemical agents.

The graphene felts are washed after 2-3 hours with distilled water to introduce functional group (oxygen) on the surface of graphene felts. The functional groups on the surface of graphene felts make the graphene felts hydrophilic. The graphene felts are analyzed for porosity, thickness, surface area and density.

According to one embodiment herein, the predetermined amount of graphene raw material is in a range of 97% w/w-100% w/w, and wherein optionally a cross-linking agent is added to the graphene raw material.

According to one embodiment herein, the graphene felts synthesized without any binder material exhibit high thermal conductivity and electrical conductivity properties.

According to one embodiment herein, the graphene raw material is selected from a group consisting of graphene sheets, graphene ribbons, graphene platelets, graphene foam, graphene sponge, graphene aerogel, graphene 3D architecture, expanded graphite, cross-linked graphene sheets, graphene onions and graphene balls.

According to one embodiment herein, the deagglomeration process is selected from a group consisting of mechanical delupping, sonication, shearing and sieve shaking processes. During the deagglomeration process, lumps of graphene material are broken into small chunks with a pre-defined (pre-set) size.

According to one embodiment herein, the method of mechanical compaction is selected from a group consisting of vacuum compaction, compression, pressing, roll compaction and injection forming processes. After mechanical compaction graphene felts are obtained.

According to one embodiment herein, the chemical agents are selected from a group consisting of acids and bases. According to one embodiment herein, the acid used for treating graphene felts is $H_2SO_4$, and the base used for treating graphene felts is KOH.

According to one embodiment herein, the graphene felts exhibit a porosity of 5-200 μM.

According to one embodiment herein, the thickness of graphene felts is within a range of 0.5 mm-15 mm.

According to one embodiment herein, the surface area of the graphene felts is within a range of 10-100 $m^2/g$.

According to one embodiment herein, the density of graphene felts is within a range of 0.02 $g/cm^3$-0.2 $g/cm^3$.

According to one embodiment herein, a method is provided for deagglomeration of graphene materials during the preparation of graphene felts. The deagglomeration process is selected from a group consisting of mechanical delumping, sonication, shearing, sieve shaking processes and combination thereof. In this process, selected agglomerated graphene material is broken down into smaller chunks with uniform size distribution for achieving good compaction during the moulding process thereby realizing good mechanical properties of the graphene felts without using any binder material.

According to one embodiment herein, a method is provided for moulding primary graphene material during the preparation/synthesis of graphene felt. The moulding process is selected from a group consisting of vacuum compaction, compression, pressing, roll compaction and injection forming processes. The nature of the moulding process has a considerable impact on the final properties of the resulting graphene felts, and wherein the final properties of the graphene felts includes a porosity, a thickness, a density, flexibility, etc. Thus, selecting an appropriate/suitable moulding process is a critical step to achieve specific properties of the graphene felts for use in a desired application.

According to one embodiment herein, the method provides graphene felts with a porosity in the range of 5-200 μm with optimizable and controllable pore structure that are used in efficient filtration and purification systems.

According to one embodiment herein, the method provides graphene felts with a thickness in the range of 0.5 mm-15 mm with a variable flexibility.

According to one embodiment herein, the method provides graphene felts with a controllable surface area in the range of 10-100 $m^2$/g for use in plurality of applications. High surface area felts are used in energy storage applications as battery, supercapacitors, fuel cells etc., energy harvesting devices based on thermoelectric, piezoelectric and pyroelectric properties of graphene and gas and chemical sensing.

According to one embodiment herein, the method yields graphene felts with a density in the range of 0.02 $g/cm^3$-0.2 $g/cm^3$. The density of graphene felts is tuned/adjusted/modified by controlling a size of graphene material during the deagglomeration process and selecting an appropriate process for moulding and tuning the parameters.

According to one embodiment herein, the method yields graphene felts with a desired surface functionalization by functionalizing the surface of the raw graphene material prior to the deagglomeration process. The resulting graphene felt will possess similar properties as of surface functionalized graphene material.

According to one embodiment herein, a method is provided for optimizing the surface morphology of the graphene felts and wherein the surface morphology is optimized by using negative moulds or positive moulds having pre-defined surface microstructure.

The embodiments herein provide methods to prepare graphene felts for use in various energy storage applications such as Gas diffusion layer and Ion-exchange membrane in fuel cell, air electrode in metal-air battery, Electrodes in metal-ion battery and supercapacitors.

The embodiments herein provide methods to prepare graphene felts that are used in various gas and chemical sensing devices with optimized selectivity and sensitivity, and purification and filtration membranes that allows only selective gasses/fluids to pass through.

The embodiments herein provide methods to prepare graphene felts that are used in noble-metal-free catalysis due to their exceptional catalytic activity, and flexible and organic electronics due to the good conductivity and flexibility characteristics.

According to one embodiment herein, the first step in synthesizing the graphene felts is choosing/selecting a correct precursor material (precursor material). The chosen/selected precursor material must have intrinsic nano and micro fibrous structure (such as graphene 3D architecture, expanded graphite and graphene aerogels). These precursor materials enable to easily entangle and overlap with one another to drive enmeshing and thereby ultimately leading to a formation of graphene felts. For materials that do not have intrinsic nano and micro fibrous nature, the concentrated solution of these graphene materials is synthesised and fibre making techniques are employed to achieve that. The fibre making techniques are electro spinning, freeze drying and cross linking with chemically or physically crosslinking agents such as divalent metal ions like $Mg^{2+}$ and $Ca^{2+}$) or trivalent metal ions such as $Fe^{3+}$, $Al^{3+}$ in a concentration of 0-3 wt % to obtain a fibre structure.

According to one embodiment herein, in the second step, the precursor graphene material is segregated based on a size distribution. A skewed size distribution prevents a compaction in graphene felts thereby resulting in poor mechanical properties of the felts. Further, formation of clumps or agglomerates in the materials increases the chances of density variation across the graphene felts. A plurality of methods are used to segregate the precursor material based on size distribution, and wherein the plurality of methods includes carding, mechanical delumping, sonication, sieve shaking processes or a combination thereof.

According to one embodiment herein, the third step in graphene felt synthesis is a compaction process. In compaction process, the precursor material/graphene raw material is placed in a mold. The mold is designed as per the requirement to impart a desired surface morphology and patterns on the graphene felts. Both the positive or negative type of mold are used. An optimized amount of graphene precursor material is added inside the mold as the amount of graphene precursor material has a direct impact on a porosity, electrical conductivity, density, thickness and flexibility of the felt. The plurality of methods for compaction include a vacuum compaction, compression, pressing, roll compaction, injection forming processes and a combination thereof. The parameters of these compaction processes are tweaked to obtain graphene felts with required properties.

According to one embodiment herein, the graphene felts are obtained after compaction. The graphene felts are subjected to chemical treatment to enhance surface features/characteristics. The graphene felts are immersed in chemical agents such as acid (sulphuric acid) or base (KOH) for 2-3 hours. The chemical agents introduce functional groups on the surface of graphene felts. The functional groups are based on nitrogen and oxygen. The graphene felts are washed after 2-3 hours with distilled water to remove the excess of chemical agents. The graphene felts become hydrophilic because of functional groups like oxygen on the surface.

According to one embodiment herein, the graphene felts are synthesized without any polymer binders. The graphene felts illustrate high thermal conductivity and electrical conductivity. These properties prove to be crucial in faster/quick heat dissipation and EMI shielding functions respectively for the battery housing.

According to one embodiment herein, the process of synthesising graphene felts comprise the following steps. Step 1 involves weight optimization and segregation of raw material and wherein the raw material is selected from a group consisting of graphene sheets, graphene ribbons, graphene platelets, graphene foam, graphene sponge, graphene aerogel, graphene 3D architecture, highly expanded graphite, cross-linked graphene sheets, graphene onions and graphene balls. This graphene material is functionalized depending on the desired application. Step-2 includes deagglomeration process to achieve uniform size distribution of graphene material using plurality of physical means which is selected from a group consisting of mechanical delumping, sonication, shearing, sieve shaking processes and combination thereof. In this step, the agglomerated lumps of graphene material are broken down into small chunks having pre-defined or pre-set size. The uniform size distribution helps in achieving high compaction during the moulding process which leads to excellent mechanical properties. Step 3 of the graphene felt preparation includes moulding of graphene material felt and wherein the moulding process is selected from a group consisting of vacuum compaction, compression, pressing, roll compaction and injection forming processes. By selecting an appropriate moulding process and controlling the associated moulding parameters, a plurality of attributes/properties of the prepared/synthesized/fabricated graphene felts are optimized. The pluralities of the properties of the felts include porosity, thickness, density, flexibility etc. Finally, in Step-4 graphene felts with optimized properties are obtained for use in applications in energy storage and harvesting devices, filtration and purification systems, chemical and gas sensing, catalysis and flexible electronics etc.

FIG. 1 illustrates a flow chart explaining the process for the synthesis of binder-free graphene felts, according to one embodiment herein. A predetermined amount of graphene raw material is segregated (101). The weight of the segregated graphene raw material is optimized (102). The graphene raw material is functionalized (103). The graphene raw material used in felt synthesis is deagglomerated for achieving uniform size distribution and uniform material density (104). The deagglomerated graphene material is poured in a pre-designed mold for mechanical compaction to obtain graphene felts (105). The graphene felts are treated with chemical agents for 2-3 hours to enhance surface characteristics (106). The graphene felts are washed after 2-3 hours with distilled water to remove excess of chemical agents (107).

Figure 2:
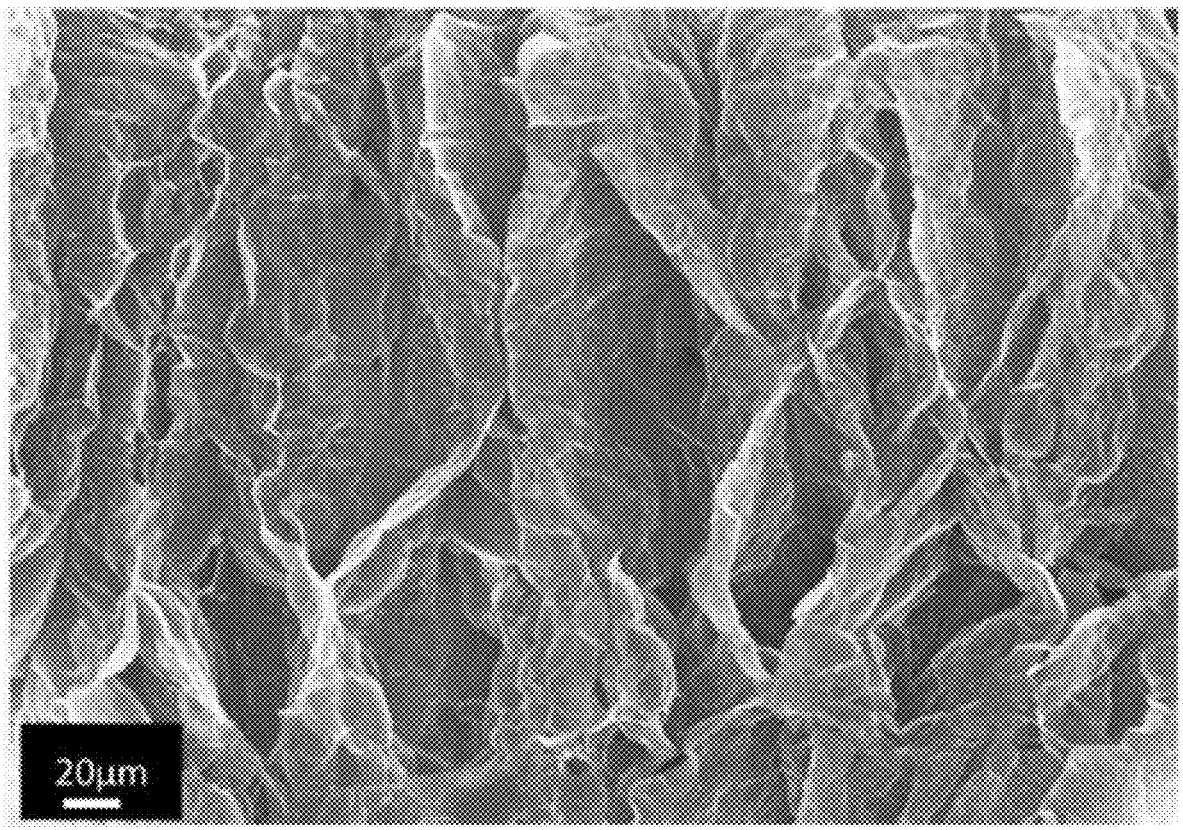
FIG. 2 illustrates a surface electron microscope (SEM) of the graphene felts, according to the one embodiment herein.

FIG. 2 illustrates a surface electron microscope (SEM) of the graphene felts, according to the one embodiment herein. FIG. 2 illustrates the 3D architecture of the graphene felt.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

Although the embodiments herein are described with various specific embodiments, it will be obvious for a person skilled in the art to practice the embodiments herein with modifications. Although the embodiments herein are described with various specific embodiments, it will be obvious for a person skilled in the art to practice the embodiments herein with modifications.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims submitted below. The scope of the embodiments herein is ascertained by the following claims.

What is claimed is:

1. A method of synthesizing graphene felts, the method comprises steps of:

segregating a predetermined amount of graphene raw material, and wherein the graphene raw material is segregated by a process selected from a group consisting of carding, mechanical delumping, sonication, shearing and sieve shaking processes;

optimizing a weight of the segregated graphene raw material;

functionalizing the graphene raw material used as a precursor material, and wherein the functionalized graphene raw material is processed to provide nano or microfibrous structure to graphene raw material, and wherein the processed nano or micro structure of graphene raw material entangle to form graphene felt during compaction processes, and wherein graphene materials without nano and micro fibrous structures are processed through electrospinning and chemical or physical crosslinking processes to prepare fibers with nano and microstructures for producing graphene felts;

deagglomerating graphene raw material for achieving a uniform size distribution and a uniform material density of graphene raw material;

pouring the deagglomerated graphene material in a pre-designed mold for mechanical compaction, and wherein the mold is selected from a group consisting of positive mold and negative mold;

treating the graphene felts with chemical agents for enhancing a surface characteristic for pre-set time period, and wherein the pre-set time period is 2-3 hours; and washing the graphene felts after the pre-set time period with distilled water to introduce functional group elements (oxygen) on the surface of graphene felts, and wherein the functional groups is introduced on the surface of graphene felts to make the graphene felts hydrophilic, and wherein the graphene felts are analyzed for porosity, thickness, surface area and density.

2. The method according to claim 1, wherein the predetermined amount of graphene raw material is in a range of 97% w/w-100% w/w.

3. The method according to claim 1, further comprises adding a cross-linking agent to the graphene raw material.

4. The method according to claim 3, wherein the cross linking agent is divalent metal ions or trivalent metal ions.

5. The method according to claim 3, wherein the divalent metal ion is $Mg^{2+}$ or $Ca^{2+}$ and wherein the trivalent metal ion is $Fe^{3+}$ or $Al^{3+}$.

6. The method according to claim 3, wherein the cross linking agent is added at a predetermined concentration level, and wherein the predetermined concentration level is within 0-3 wt %.

7. The method according to claim 1, wherein the graphene felts are synthesized without any binder material to exhibit a high thermal conductivity and an electrical conductivity properties.

8. The method according to claim 1, wherein the graphene raw material is selected from a group consisting of graphene sheets, graphene ribbons, graphene platelets, graphene foam, graphene sponge, graphene aerogel, graphene 3D architecture, expanded graphite, cross-linked graphene sheets, graphene onions and graphene balls.

9. The method according to claim 1, wherein the deagglomeration process is selected from a group consisting of mechanical delumping, sonication, shearing and sieve shaking processes, and wherein lumps of graphene material are broken into small chunks with pre-defined size in deagglomeration process.

10. The method according to claim 1, wherein a mechanical compaction process is selected from a group consisting of vacuum compaction, compression, pressing, roll compaction and injection forming processes, and wherein graphene felts are obtained after the mechanical compaction process.

11. The method according to claim 1, wherein the chemical agents are selected from a group consisting of acids and bases, and wherein the acid used for treating graphene felts is $H_2SO_4$, and wherein the base used for treating graphene felts is KOH.

12. The method according to claim 1, wherein the graphene felts exhibit a porosity in a range of 5-200 μm.

13. The method according to claim 1, wherein the fabricated graphene felts has a thickness of 0.5 mm-15 mm.

14. The method according to claim 1, wherein the surface area of the graphene felts is within a range of 10-100 $m^2/g$.

15. The method according to claim 1, wherein the density of graphene felts is within a range of 0.02 $g/cm^3$-0.2 $g/cm^3$.

* * * * *